United States Patent [19]
Shimizu

[11] Patent Number: 5,239,558
[45] Date of Patent: Aug. 24, 1993

[54] PULSE CODE MODULATION CIRCUIT

[75] Inventor: Shin Shimizu, Tokyo, Japan

[73] Assignee: Nippon Steel Corporation, Tokyo, Japan

[21] Appl. No.: 751,534

[22] Filed: Aug. 29, 1991

[30] Foreign Application Priority Data

Aug. 30, 1990 [JP] Japan .................................. 2-229771

[51] Int. Cl.$^5$ ........................................... H04B 14/04
[52] U.S. Cl. ......................................... 375/25; 381/32
[58] Field of Search ..................... 375/25, 27; 341/126, 341/143; 381/31, 32

[56] References Cited

U.S. PATENT DOCUMENTS

| | | | |
|---|---|---|---|
| 4,464,683 | 8/1984 | Thompson | 375/25 X |
| 4,528,689 | 7/1985 | Katz | 381/32 |
| 4,540,973 | 9/1985 | Grallert | 375/25 X |

Primary Examiner—Curtis Kuntz
Assistant Examiner—Tesfaldet Bocure
Attorney, Agent, or Firm—Pollock, Vande Sande & Priddy

[57] ABSTRACT

A pulse code modulation circuit comprises a circuit for converting an input analog signal into a digital signal; processing circuit including a plurality of memories, each of which is a memory whose contents can be freely rewritten, for storing different PCM coding rules for pulse-code modulation, respectively, and for performing on an input signal applied thereto pulse-code modulation according to a selected one of the PCM coding rules stored in the memories, switching circuit provided between the converting circuit and the processing circuit for applying the digital signal converted by the converting circuit as the input signal to a selected one of the memories in the processing circuit so that the converted digital signal is subjected to pulse-code modulation based on the selected one of the PCM coding rules; and a controlling circuit for controlling the switching circuit in accordance with a level of an output signal of the processing circuit so that the memory to which the digital signal is applied is selected in accordance with the level of the output signal of the processing circuit.

2 Claims, 1 Drawing Sheet

PULSE CODE MODULATION CIRCUIT

BACKGROUND OF THE INVENTION

1. Field of the Invention

The present invention relates to a pulse code modulation circuit for converting an analog signal into a digital signal and pulse-code modulating this digital signal in accordance with a predetermined rule coding.

2. Description of the Prior Art

A pulse code modulation circuit is known which converts an analog signal into a digital signal by using a parallel A/D converter and then applies pulse-code modulation (hereinafter abbreviated as PCM) to this digital signal in accordance with a predetermined rule, as disclosed, for example, in "A Video-Rate 10-bit Two-step Parallel A/D Converter" by H. Kimura, et al in the technical research report of the Institute of Electronic Information and Communication Engineers of Japan, ICD 90-55-63, Jun. 22, 1990, pp 57, FIG. 1.

In the pulse-code modulation circuit, there is often desired to alter the rule of PCM in accordance with the level of an analog signal or the level of a digital signal as converted or in accordance with the result of application of the PCM. In the conventional pulse-code modulation circuit, however, a predetermined rule of the PCM is stored in a read only memory (ROM), so that it is not possible to freely rewrite the content of the ROM. Even if an EPROM is used, it takes a long time to rewrite the content and it is not possible to rewrite the content in real time during the PCM processing. Since a digital signal which is produced by converting an analog signal is subjected to a pulse-code modulation according to a given specific coding rule, there is no freedom of selecting an efficient coding rule in accordance with the digital signal.

SUMMARY OF THE INVENTION

It is an object of the present invention to provide a pulse code modulation circuit which stores a plurality of different coding rules and performs pulse-code modulation on a digital signal by selectively utilizing one of the PCM coding rules.

In order to achieve the above-described object, the pulse-code conversion circuit of the present invention comprises a circuit for converting an input analog signal into a digital signal, processing means including a plurality of memories for storing data relating to different PCM rules for pulse-code modulation, respectively and performing pulse-code modulation according to a selected one of the PCM rules represented by the data stored in one of the memories on an input signal applied thereto and connection change-over means provided between the converting circuit and the processing means for applying the output of the converting circuit as the input signal to a selected one of the memories in the processing means so that the converted digital signal is subjected to pulse-code modulation based on the selected one of the PCM rules.

In a preferred embodiment of the present invention, each of the memories is a random access memory the contents of which are capable of being freely rewritten.

With the above structure of the present invention, data relating to different coding rules are stored in a plurality of memories and a digital signal is applied to a selected one of the memories so that it is possible to perform a pulse-code modulation on the digital signal based on a suitable coding rule stored in the selected one memory in accordance with characteristics of the digital signal. Also it is possible, when each of the memories is made of a random access memory, to freely rewrite the contents of the memories so as to store various data relating to different coding rules in the memories at desired timings thereby broadening the degree of freedom in selection of the coding rules.

DESCRIPTION OF THE PREFERRED EMBODIMENTS

Figure 1:
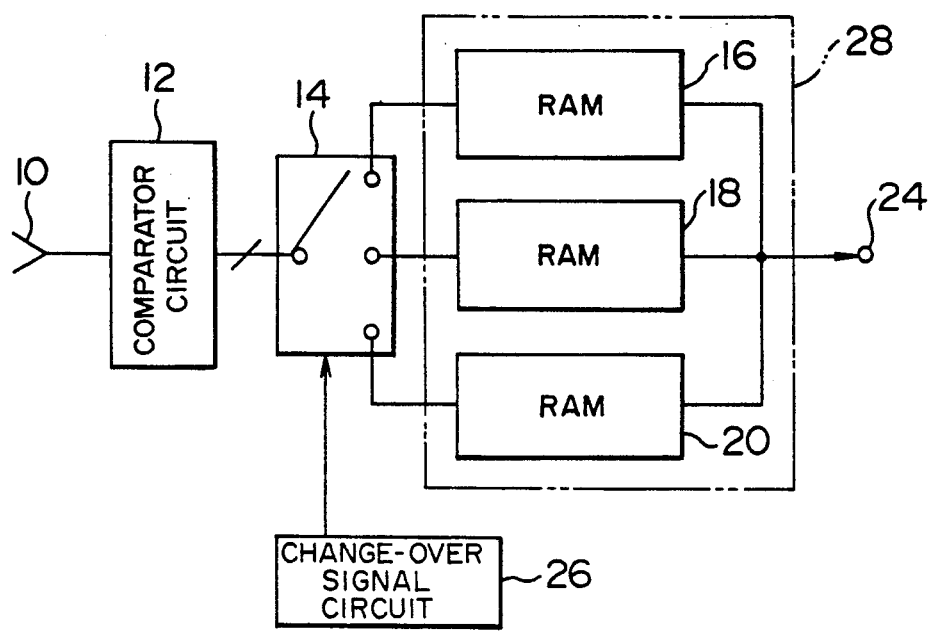
FIG. 1 is a block diagram showing a pulse modulation circuit of a first embodiment of the present invention.

The first embodiment of the present invention will be explained with reference to FIG. 1. In FIG. 1, an analog signal is applied to a terminal 10 and the signal is then applied to a comparator circuit 12. The comparator circuit 12 comprises $2^n-1$ comparators when the input digital signal is expressed by n bits of binary signal "0" or "1".

For example, in the case of an eight-bit digital signal, the comparator circuit is provided with 255 comparators each having first and second input terminals. The first input terminals of the comparators receive respectively reference voltages corresponding to respective levels of divisions of a full scale voltage E divided by $2^8=256$, wherein the full scale voltage E is corresponding to a possible maximum value of the input analog signal to be applied to the comparator circuit 12. Thus, the reference signals applied to the respective first terminals of the comparator circuit represent numeric values 0 to 255 expressed by 8-bit binary signals. The terminal 10 is connected to the second input terminals of the comparators so that an analog signal applied to the terminal 10 is compared with the reference signals, respectively. When it is judged that the level of the analog signal is between the values of adjacent two reference signals, the comparator circuit produces a digital signal corresponding to the level of a smaller one of the adjacent two reference signals.

The digital signal produced from the comparator circuit 12 is further subjected to pulse-code modulation according to a predetermined coding rule. There are various coding rules such as, for example, coding by complementation of a digital signal multiplied by 1.5, coding by complementation of a square of a digital signal, coding by adding a parity bit or coding by an operation according to a polynominal formula. Further, it is sometimes desired to alter the PCM coding rule depending according to circumstances.

For this purpose, the digital signal from the comparator 12 is applied through a switch 14 to one of a plurality of random access memories (RAMs) 16, 18 and 20 included in a processing circuit 28. These RAMs may be either dynamic RAMs (DRAMs) or static RAMs (SRAMs). The contents of these RAMs represent signals obtained by performing pulse-code modulation according to different coding rules for PCM, respectively, on the inputted digital signal and can be rewritten freely from outside. The digital signal from the comparator 12 is used as an address signal of each of the RAMs 16 to 20. When the digital signal is applied to any one of the RAMs, the contents stored in the address of the corresponding RAM connected by the switch 14 is outputted from a terminal 24. The contents as outputted represent a signal obtained by performing pulse-code modulation in accordance with a selected coding rule on the digital signal.

Alternatively, the processing circuit may be arranged such that the RAMs store different coding rules for PCM and the digital signal is used as a read-out signal for reading out the contents of the connected RAM so that the digital signal is subjected to pulse-code modulation according to the coding rule stored in the connected RAM and the pulse-code modulated signal is produced from the processing circuit 28.

The switch 14 selects one of the RAMs which stores the data relating to a desired PCM coding rule based on a signal given from the change-over signal circuit 26 through the operation of an operator. The selection of the rule for PCM coding is made, for example, so as to minimize noise in the pulse-code modulated signal in consideration of the level of noise included in the signal. An address bus and a data bus for writing data, which are not shown in the drawing, are connected to each of the RAMs 16 to 20, so that the contents of the RAM can be rewritten as desired. Since a plurality of RAMs are provided, it is possible to rewrite the contents of one of the RAMs while making an access to another RAM.

Figure 2:
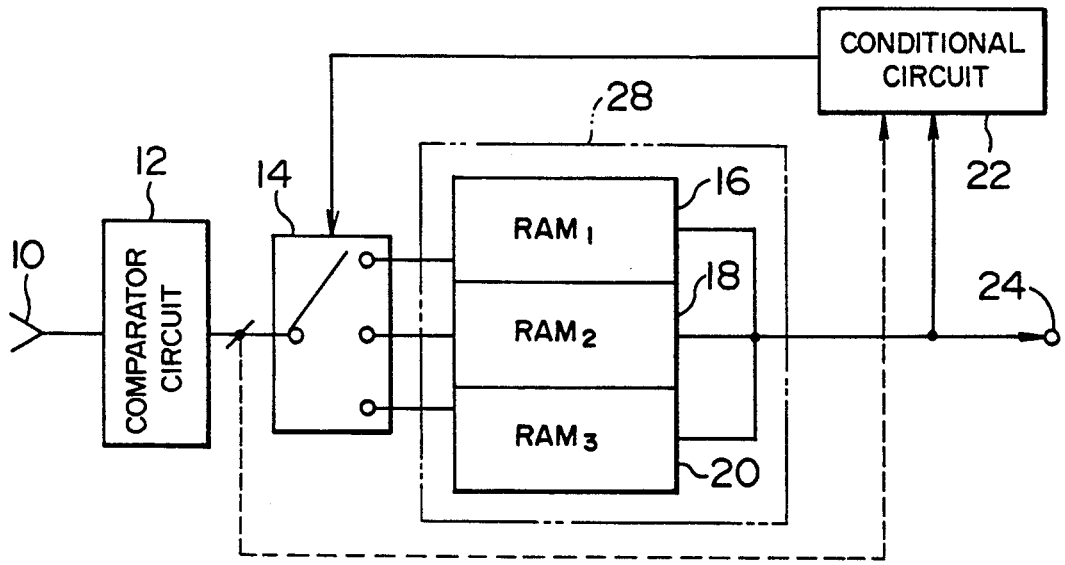
FIG. 2 is a block diagram showing a pulse code modulation circuit of a second embodiment of the present invention.

FIG. 2 shows a circuit diagram in the second embodiment of the present invention. The second embodiment is different from the first embodiment in that a conditional circuit 22 is added in the second embodiment. All the other components are the same as or similar to those in the circuits of the first embodiment shown in FIG. 1. The same or similar components are indicated by the same reference numerals and the detailed explanation thereof is omitted.

The conditional circuit 22 detects one of a plurality of preset conditions which the digital signal outputted from the processing circuit 28 meets. The conditional circuit 22 then changes over the switch 14 so as to connect the output of the comparator circuit 12 to one of the RAMs which stores data relating to the PCM rule corresponding to the detected condition. For example, the RAM 16 stores data relating to a coding rule for producing a complement of the input signal multiplied by 1.5, the RAM 18 stores data relating to coding rule for producing a complement of the input signal multiplied by 2 and the RAM 20 stores data relating to a coding rule for producing a complement of a square of the input signal. The conditions for changing over the switch 14 are as follows, for example. When an output X from the RAMs 16, 18 and 20 is $X \geq A$ for two preset constants A and B (A>B), the RAM 16 is selected. When $A \geq X \geq B$, the RAM 18 is selected, and when $B \geq X$, the RAM 20 is selected. As described above, the PCM of multiplication by 1.5 is selected when the output from the comparator 12 is relatively large, the PCM of multiplication by 2.0 is selected when the output from the comparator 12 is relatively small, and the PCM of square operation is selected when the output from the comparator 12 is very small, thereby restricting the level of noise included in the modulated signal a small value.

In the above embodiment, the switch 14 is changed over in accordance with the output from the processing circuit 28. It is also possible to obtain the same effect by arranging such that the output of the comparator circuit 12 is applied to the conditional circuit 22 as shown by the dotted line in FIG. 2 and the switch 14 is changed over in accordance with the output of the comparator circuit 12 so as to select a RAM which meets the condition.

As explained above, according to the present invention, data relating to different PCM rules are stored in a plurality of memories, respectively, included in the processing circuit, and the memories are used selectively by changing over the connections thereof as required. Therefore, it is possible to freely select any one of a plurality of different PCM rules in accordance with the state of the input or modulated signal, in addition to a given one PCM coding rule. Accordingly, it is possible to provide a pulse code modulation circuit which can be applied, for example, to restrict the level of a noise included in the signal to a minimum by suitably carrying out the change-over of the PCM rules.

I claim:

1. A pulse code modulation circuit comprising:
a circuit for converting an input analog signal into a digital signal;
processing means including a plurality of memories, each of which is a memory whose contents can be freely rewritten, for storing different PCM coding rules for pulse-code modulation, respectively, and for performing on an input signal applied thereto pulse-code modulation according to a selected one of the PCM coding rules stored in the memories;
switching means provided between the converting circuit and the processing means for applying the digital signal converted by the converting circuit as the input signal to a selected one of the memories in the processing means so that the converted digital signal is subjected to pulse-code modulation based on the selected one of the PCM coding rules, and
means for controlling said switching means in accordance with a level of an output signal of sad processing means so that said memory to which the digital signal is applied is selected in accordance with the level of the output signal of said processing means.

2. A pulse code modulation circuit comprising:
means for converting an input analog signal into a digital signal;
processing means including a plurality of memories, each of which is a memory whose contents can be freely rewritten for storing different PCM coding rules for pulse-code modulation, respectively, and for performing on an input signal applied thereto pulse-code modulation according to a selected one of the PCM coding rules stored in the memories;
switching means provided between the converting circuit and the processing means for applying the digital signal converted by the converting circuit as the input signal to a selected one of the memories in the processing means so that the converted digital signal is subjected to pulse-code modulation based on the selected one of the PCM coding rules; and
means for controlling said switching means in accordance with a level of an output signal of said converting circuit so that said memory to which the digital signal is applied is selected according to the level of the output signal of said converting circuit.

* * * * *